(12) United States Patent
Lee et al.

(10) Patent No.: US 10,977,677 B2
(45) Date of Patent: Apr. 13, 2021

(54) CONTACT IMPORTER

(71) Applicant: Dropbox, Inc., San Francisco, CA (US)

(72) Inventors: Silvanus Lee, San Francisco, CA (US); Franklin Ta, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 397 days.

(21) Appl. No.: 14/054,210

(22) Filed: Oct. 15, 2013

(65) Prior Publication Data

US 2015/0019311 A1   Jan. 15, 2015

Related U.S. Application Data

(60) Provisional application No. 61/846,577, filed on Jul. 15, 2013.

(51) Int. Cl.
 *G06Q 30/02* (2012.01)
(52) U.S. Cl.
 CPC .............................. *G06Q 30/0214* (2013.01)
(58) Field of Classification Search
 None
 See application file for complete search history.

(56) References Cited

U.S. PATENT DOCUMENTS

| | | | |
|---|---|---|---|
| 7,596,597 B2 | 9/2009 | Liu et al. | |
| 7,890,871 B2 * | 2/2011 | Etkin | G06F 16/9535 715/738 |
| 8,341,184 B2 | 12/2012 | Bonev et al. | |
| 8,417,558 B2 * | 4/2013 | Koonce | G06Q 30/0243 705/7.29 |
| 8,620,942 B1 * | 12/2013 | Hoffman | G06Q 10/107 707/766 |
| 2003/0078981 A1 * | 4/2003 | Harms | G06Q 10/107 709/206 |
| 2005/0015456 A1 * | 1/2005 | Martinson, Jr. | H04L 51/12 709/207 |
| 2007/0118399 A1 * | 5/2007 | Avinash | G06F 19/322 705/2 |
| 2009/0070684 A1 * | 3/2009 | Aldrich | G06Q 50/01 715/743 |

(Continued)

OTHER PUBLICATIONS

Morgan, "New ways to invite your friends"(Published: https://scorebig.wordpress.com/2011/04/26/new-ways-to-invite-your-friends/—Apr. 26, 2011) (Year: 2011).*

*Primary Examiner* — Chrystina E Zelaskiewicz
*Assistant Examiner* — Alfred H Tsui
(74) *Attorney, Agent, or Firm* — Polsinelli PC

(57) ABSTRACT

Embodiments are provided for importing contacts. A contact importer leverages the various contacts associated with a user of a content management service to find potential new users and/or customers. A contact importer may run on one or more devices of a user associated with an account on a content management system, and import various contacts of that user to a contact list. The list may be culled to weed out non-human contacts, and processed so as to assign an affinity score to each contact, expressing a degree of affinity to the user. Incentives may be offered to the user for either sending or approving an invitation to a contact to register with the content management system, paid upon the invitee successfully registering. Different incentives may be offered for an accepted invitation from various contacts or classes thereof.

14 Claims, 6 Drawing Sheets

(56) References Cited

U.S. PATENT DOCUMENTS

| | | |
|---|---|---|
| 2010/0082693 A1 | 4/2010 | Hugg et al. |
| 2010/0198854 A1 | 8/2010 | Chitturi et al. |
| 2011/0296004 A1 | 12/2011 | Swahar |
| 2012/0296988 A1* | 11/2012 | Rao .................. G06Q 10/107 709/206 |
| 2013/0007050 A1 | 1/2013 | Work |
| 2013/0067039 A1 | 3/2013 | Hartzler et al. |
| 2013/0091287 A1 | 4/2013 | Chitturi |
| 2014/0006517 A1* | 1/2014 | Hsiao .................. A63F 13/795 709/205 |

* cited by examiner

CONTACT IMPORTER

CROSS-REFERENCE TO RELATED APPLICATIONS

The present application claims the benefit of U.S. Provisional Patent Application No. 61/846,577, filed on Jul. 15, 2013, the entire disclosure of which is hereby incorporated herein by this reference.

FIELD OF THE INVENTION

Various embodiments relate generally to importing user contacts.

BACKGROUND

Existing users of various web platforms, social media platforms, and Internet accessible data storage and management services, such as, for example, content management systems, are often the best source of referrals for new users. Generally, inasmuch as when such services gain more users they are (i) able to offer more features, (ii) have more market presence, clout and revenue, and consequently (iii) are able to make more and better upgrades and offerings, it is in both a current user's interest as well as in the system's interest for the user to refer persons he or she knows, or is acquainted with, to the service as potential new users. However, users do not always recognize such a benefit. Even if they do, they do not tend to take the initiative to send referral requests or notifications on their own, or prioritize their contacts by, for example, degree of affinity to the user or likelihood of a given contact to respond positively to a referral request. An astute system, service or platform needs to provide the resources, intelligence and incentives to successfully mine a user's contacts to sign up additional users.

Accordingly, there is a need to both harvest the various contacts associated with a user of a, for example, content management system, process the contacts so harvested, and streamline the referral request process to maximize the likelihood that a referral request sent to such contacts will result in an acceptance.

SUMMARY

Embodiments are provided for importing contacts. Methods, systems, and computer readable media for a contact importer functionality are provided. A contact importer leverages the various contacts associated with a user of, for example, a content management service to find potential new users and/or customers. A contact importer may run on one or more devices of a user associated with an account on a content management system, and import various contacts of that user to a contact list. The list may be initially culled to weed out non-human contacts, and then further processed so as to assign an affinity score to each contact, expressing a degree or quality of affinity to the user. Various incentives may be offered to the user in return for either sending to, or approving the sending of an invitation to, a contact to register with the content management system and the invitee successfully registering with the content management system. Different incentives may be offered to the user for an accepted invitation for each of the various contacts or classes thereof, as a function of the affinity score of that contact. In some embodiments the score is a combination of the results of all affinity tests performed, and in other embodiments it may be the highest score obtained over all the tests performed.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Methods, systems, and computer readable media for a contact importer functionality are provided. A contact importer leverages the various contacts associated with a user of, for example, a web platform, social media platform, Internet accessible data storage and management service, such as, for example, a content management system, or the like to find potential new users and/or customers. For ease of illustration, the following description will speak in terms of a contact importer for a content management system; however it is understood that this is for illustration only, and the disclosed functionality equally applies to any system, platform, service, or the like that may benefit from leveraging contacts of current users to sign up new users and new accounts. In various exemplary embodiments, a contact importer may run on one or more devices of a user associated with an account on a content management system, and may import various contacts of that user from all such devices to a contact list. The list may initially be culled to weed out non-human contacts, and then further processed so as to assign an affinity score to each contact, expressing a degree or quality of affinity between that contact and the user. Various incentives may be offered to the user in return for either sending to, or approving the sending of an invitation to, a contact to register with the content management system, and the invitee successfully registering with the content management system. Different incentives may be offered to the user for an accepted invitation for each of the various contacts or classes thereof, as a function of the affinity score of that contact. In some embodiments the score is a combination of the results of all affinity tests performed, and in other embodiments it may be the highest score obtained over all the tests performed.

As noted, for purposes of description and simplicity, methods, systems and computer readable mediums will be described for a content storage and management service (or system), and in particular, for a contact importer and processing technology for use in connection with such a content storage and management service. However, the terms "content storage service" and "content management system" are used herein to refer broadly to a variety of storage providers and management service providers as well as systems, services platforms and entities handling a wide variety of types of content, files, portions of files, and/or other types of data. Those with skill in the art will recognize that the methods, systems, and mediums described may be used for a variety of storage providers/services and types of content, files, portions of files, and/or other types of data.

Figure 1:
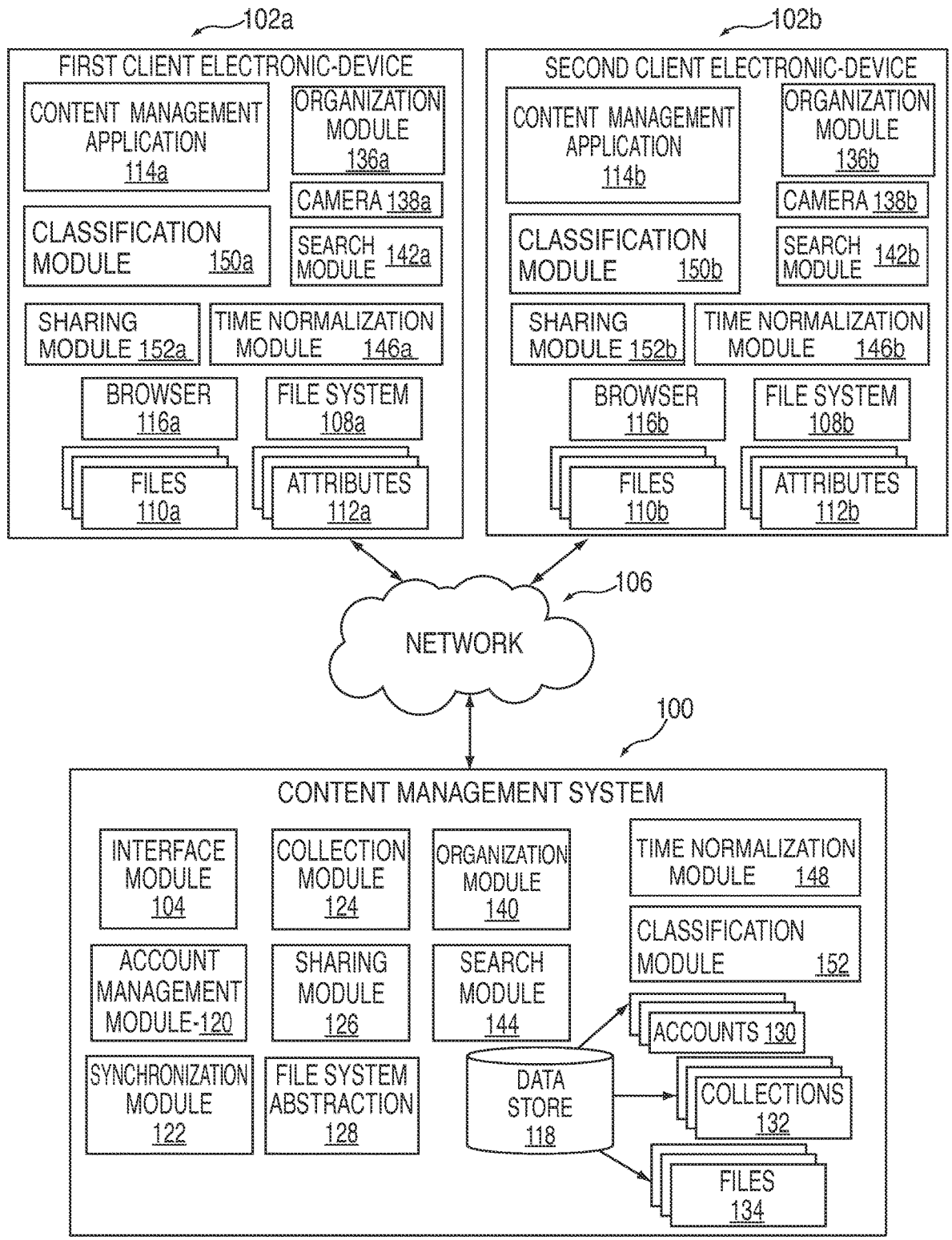
FIG. 1 is an exemplary system in which a contact importer may be provided in accordance with some embodiments of the invention.

FIG. 1 depicts an exemplary system for which a contact importer may be provided in accordance with some embodiments of the invention. Elements in FIG. 1, including, but not limited to, first client electronic device 102a, second client electronic device 102b, and content management system 100, may communicate by sending and/or receiving data over network 106. Network 106 may be any network, combination of networks, or network devices that may carry data communication. For example, network 106 may be any one or any combination of LAN (local area network), WAN (wide area network), telephone network, wireless network, point-to point network, star network, token ring network, hub network, or any other configuration.

Network 106 may support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 may communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include, but is not limited to, the following: creation time timestamp, geolocation, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.\

A time normalization module 146 (e.g., 146a and 146b) may be used to normalize dates and times stored with a content item. An example of time normalization is provided in U.S. patent application Ser. No. 13/888,118, entitled "Date and Time Handling," filed on May 6, 2013, which claims the benefit of U.S. Provisional Patent Application No. 61/801,318, entitled "Date and Time Handling," filed on Mar. 15, 2013, both of which are incorporated herein by reference in their entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. patent application Ser. No. 13/888,186, entitled "Presentation and Organization of Content," filed on May 6, 2013, which claims the benefit of U.S. Provisional Patent Application No. 61/794,184, entitled "Presentation and Organization of Content," filed on Mar. 15, 2013, both of which are incorporated herein by reference in their entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104 and accessible modules for device 102. Web browser 116a and 116b (collectively 116) may be used to display a web page front end for a client application that may provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 may interact with any number of other modules of content management system 100.

An account may be used to store content, such as documents, text files, audio files, video files, etc., from one or more client devices 102 authorized on the account. The content may also include folders of various types with different behaviors, or other mechanisms of grouping content items together. For example, an account may include a public folder that is accessible to any user. The public folder may be assigned a web-accessible address. A link to the web-accessible address may be used to access the contents of the public folder. In another example, an account may include a photos folder that is intended for photos and that provides specific attributes and actions tailored for photos; an audio folder that provides the ability to play back audio files and perform other audio related actions; or other special purpose folders. An account may also include shared folders or group folders that are linked with and available to multiple user accounts. The permissions for multiple users may be different for a shared folder.

Content items (e.g., files 110) may be stored in data store 118. Data store 118 may be a storage device, multiple storage devices, or a server. Alternatively, data store 118 may be cloud storage provider or network storage accessible via one or more communications networks. Content management system 100 may hide the complexity and details from client devices 102 by using a file system abstraction 128 (e.g., a file system database abstraction layer) so that client devices 102 do not need to know exactly where the content items are being stored by the content management system 100. Embodiments may store the content items in the same folder hierarchy as they appear on client device 102. Alternatively, content management system 100 may store the content items in various orders, arrangements, and/or hierarchies. Content management system 100 may store the content items in a network accessible storage (SAN) device, in a redundant array of inexpensive disks (RAID), etc. Content management system 100 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a file system, or any other collection of data. In one variation, each content item stored in data store 118 may be assigned a system-wide unique identifier.

Data store 118 may decrease the amount of storage space required by identifying duplicate files or duplicate chunks of files. Instead of storing multiple copies, data store 118 may store a single copy of a file 134 and then use a pointer or other mechanism to link the duplicates to the single copy. Similarly, data store 118 may store files 134 more efficiently, as well as provide the ability to undo operations, by using a file version control that tracks changes to files, different versions of files (including diverging version trees), and a change history. The change history may include a set of changes that, when applied to the original file version, produce the changed file version.

Content management system 100 may be configured to support automatic synchronization of content from one or more client devices 102. The synchronization may be platform independent. That is, the content may be synchronized across multiple client devices 102 of varying type, capabilities, operating systems, etc. For example, client device 102a may include client software, which synchronizes, via a synchronization module 122 at content management system 100, content in client device 102 file system 108 with the content in an associated user account. In some cases, the client software may synchronize any changes to content in a designated folder and its sub-folders, such as new, deleted, modified, copied, or moved files or folders. In one example of client software that integrates with an existing content management application, a user may manipulate content directly in a local folder, while a background process monitors the local folder for changes and synchronizes those changes to content management system 100. In some embodiments, a background process may identify content that has been updated at content management system 100 and synchronize those changes to the local folder. The client software may provide notifications of synchronization operations, and may provide indications of content statuses directly within the content management application. Sometimes client device 102 may not have a network connection available. In this scenario, the client software may monitor the linked folder for file changes and queue those changes for later synchronization to content management system 100 when a network connection is available. Similarly, a user may manually stop or pause synchronization with content management system 100.

A user may also view or manipulate content via a web interface generated and served by user interface module 104. For example, the user may navigate in a web browser to a web address provided by content management system 100. Changes or updates to content in the data store 118 made through the web interface, such as uploading a new version of a file, may be propagated back to other client devices 102 associated with the user's account. For example, multiple client devices 102, each with their own client software, may be associated with a single account and files in the account may be synchronized between each of the multiple client devices 102.

Content management system 100 may include sharing module 126 for managing sharing content and/or collections of content publicly or privately. Sharing module 126 may manage sharing independently or in conjunction with counterpart sharing module (e.g., 152a and 152b). Sharing content publicly may include making the content item and/or the collection accessible from any computing device in network communication with content management system 100. Sharing content privately may include linking a content item and/or a collection in data store 118 with two or more user accounts so that each user account has access to the content item. The sharing may be performed in a platform independent manner. That is, the content may be shared across multiple client devices 102 of varying type, capabilities, operating systems, etc. The content may also be shared across varying types of user accounts. In particular, the sharing module 126 may be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is provided in U.S. patent application Ser. No. 14/054,103, entitled "Systems and Methods for Presenting Content Items in a Collections View," filed on Oct. 15, 2013, which claims the benefit of U.S. Provisional Patent Application No. 61/750,791, entitled "Presenting Content Items in a Collections View," filed on Jan. 9, 2013, both of which are incorporated herein by reference in their entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item file to a directory) the content item in another location within data storage in order to place the content item in the collection.

In some embodiments, content management system 100 may be configured to maintain a content directory or a database table/entity for content items where each entry or row identifies the location of each content item in data store 118. In some embodiments, a unique or a nearly unique content identifier may be stored for each content item stored in the data store 118.

Metadata may be stored for each content item. For example, metadata may include a content path that may be used to identify the content item. The content path may include the name of the content item and a folder hierarchy associated with the content item (e.g., the path for storage locally within a client device 102). In another example, the content path may include a folder or path of folders in which the content item is placed as well as the name of the content item. Content management system 100 may use the content path to present the content items in the appropriate folder hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator (URL), which allows any web browser to access the content in content management system 100 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be transmitted to content management system 100 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be transmitted to content management system 100 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or false to indicate that a URL to the content item has not been created. Sharing module 126 may be configured to change the value of the flag to 1 or true after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This allows a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Next described is an exemplary user interface, and various exemplary process flows, which may be implemented in an exemplary system such as is depicted in FIG. 1, to provide a contact importer.

Exemplary User Interface

Figure 2:
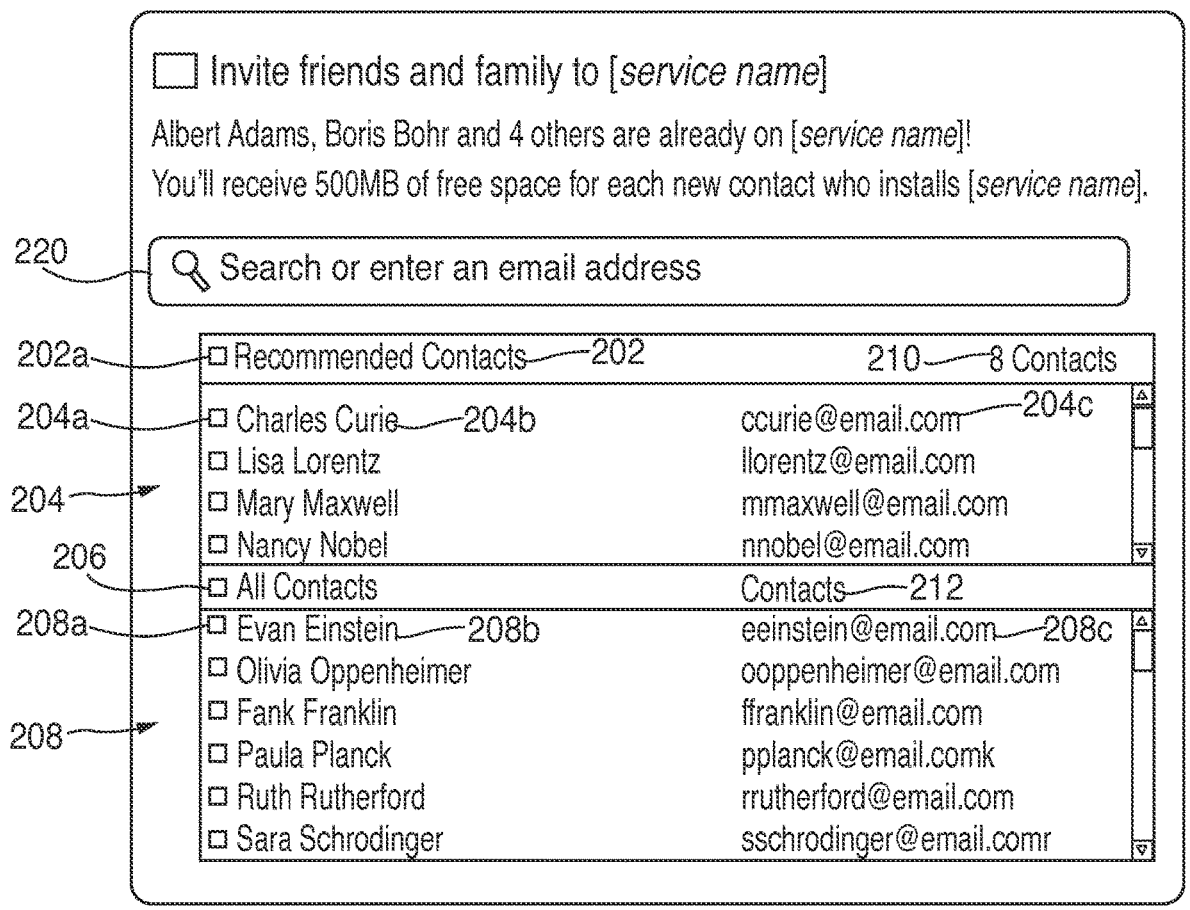
FIG. 2 is an exemplary user interface for a contact importer in accordance with some embodiments of the invention.

FIG. 2 illustrates an exemplary screen shot that may be provided to a user according to exemplary embodiments of the present invention. The screen shot is generic to an online or web accessible service or application that the user uses, which seeks to add additional contacts of the user as new subscribers, registered users or the like. With reference to FIG. 2, there is seen a banner across the top identifying the screen as one relating to an invitation for user to invite his or her friends or family to the service. The service may be, for example, a content management service, or various other services, platforms and systems as described above. A second line across the top of the screen reminds or informs the user that six of his contacts are already on the service, explicitly naming two of them. This may be an incentive to a user to see that his or her circle of friends or contacts has genuine interest in the service and therefore motivates the user to solicit other contacts to join the service. As an additional incentive, the user interface informs the user that she will receive 500 megabytes of free content storage space for each new contact who installs this service. This exemplary type of incentive is related to a content management service or other cloud storage service whose stock and trade is, obviously, storage space. The incentive is to obtain free storage space in return for invitee contacts actually registering with and installing the service in question.

As shown at 220, the interface allows the user to search for or enter a known email address to find a particular contact. In addition, the remainder of the interface allows a user to navigate through a section of recommended contacts 202 (the number of such recommended contacts is provided at 210) and also to navigate through all of her contacts 212. Thus, for each contact, there may be check box 204*a* listed next to the contact's name 204*b* and an email address 204*c*, of that contact.

Similarly, in the all contacts section, there may be a check box 208*a*, a contact name 208*b* and an email, 208*c*, in wholly analogous fashion. For ease of illustration, the exemplary screen shot presented in FIG. 2 lists contacts whose first and second names begin with the same letter, and no same letter combination is used for any two contact records. Thus one may easily visually discern each contact record (which occupies one line).

Overall Process

In exemplary embodiments of the present invention known techniques may be used to identify or locate, and then import a set of user contacts. Such known techniques may, for example, include the use of known software packages that search for and import contacts on the user device, such as, for example, CloudSponge, Contacts Importer (Android™ application), and various similar applications, utilities or plug-ins that are available.

Contacts may be imported from a user's email client, from a user's phone records, or from a user's list of friends and/or family associated with a social network, for example. In addition, potential contacts may also be gleaned from a user's various interactions on the content management system utilizing the contact importer tool as described herein. For example, persons with whom a user often shares photos or other content items, but who are not registered members or users of the content management system are prime candidates for referral invitations. Such persons have already seen many of the features available on the content management system, and there is a strong familiarity factor operative.

In exemplary embodiments of the present invention, once a global or comprehensive list of available user contacts has been created, various operations may be performed on the contacts so located so as to, for example, generate a recommended contact list and display that prominently, as shown at 204 of FIG. 2. Moreover, various offers and incentives may be presented to the user in return for her co-operation in sending out invitations to the recommended contacts, or, for example, in approving automatically generated, or partially automatically generated, invitations by the system.

Figure 3:
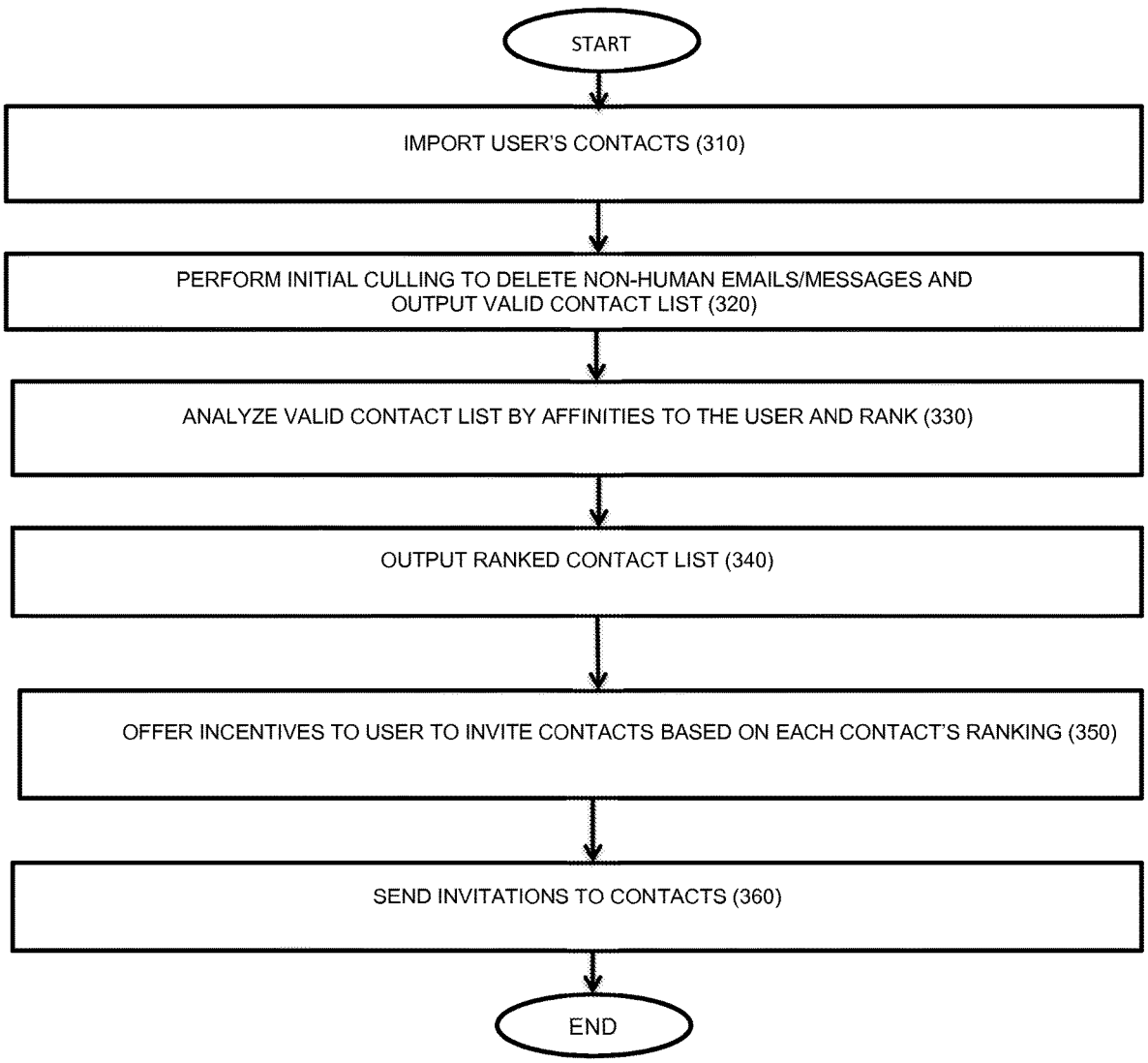
FIG. 3 is an exemplary process flow diagram for an illustrative contact importer in accordance with some embodiments of the invention.

Summarizing the above, FIG. 3 is an exemplary flowchart for a contact importer in accordance with some embodiments of the invention. FIG. 3 illustrates an overall high level process according to some embodiments.

With reference thereto, process flow begins at 300. At 310 a user's contacts may be imported, as noted above. At 320, given that a user may have many contacts that are not actual persons, an initial culling may be performed. Thus, some determinants on the backend of an exemplary system may be performed to determine which contacts are less likely to be human email contacts. For example, a very simple filter may be applied to filter all registered domains, so as to weed out email addresses of putative contacts that are not likely to be human. This would include, for example, commercial domains, such as Craigslist™, or banking, credit card and similar financial services domains. This would also include, for example, mercantile domains such as online stores, e.g., Amazon.com, warehouse clubs, online clothiers, and the like, that often send emails to their customers with promotions, coupons, transaction follow-ups and confirmations or suggestions.

Additionally, any of a user's contacts that have already registered with the content management system would also be culled. However, as noted in connection with FIG. 2, an exemplary system may store some or all of their names, and their total number, to induce the user to invite his other contacts. An example of such use is the "Albert Adams, Boris Bohr and 4 others are already on [service name]" message shown in FIG. 2.

Continuing with reference to FIG. 3, following the initial culling at 320, a valid contact list may be generated, being simply the initial set of all contacts, less the contacts deleted during step 320. At 330 this valid contact list may be analyzed and each contact scored.

As will be described in more detail below, scoring of contacts may be performed to identify a measure of affinity between the user and a contact. The guiding principle is to identify the set of contacts of a given user that are most likely to accept an invitation from he or she. Thus, (i) contacts with the same last name as the user—indicating familial ties—may be scored with a certain score A, (ii) contacts with the same email domain name—indicating coworkers, co-students, or members of the same company, business entity or professional organization, for example—with a different score B, and (iii) contacts with whom the user has shared content items on the content management system may be ranked with still a different score C, for example. There may be dozens of affinities that may be tested for, and each affinity may be assigned a separate score. The score values may be, for example, cumulative as to each contact, so as to generate a true "overall" score of affinity or similarity to the user, or, for example, the scores may not be cumulative, and only the highest score between the user and the contact may be stored, for example, to simplify an exemplary scoring system.

In addition, there may be "anti-affinity" checks built in, to insure that the determined affinities (and associated scores) are accurate. Thus, for example, millions of persons have gmail.com or yahoo.com, and even aol.com email domains. A user having a free of charge email account with the same national email hosting entity as does a contact, in and of itself, may obviously not be an indication of affinity. Thus, for example, a scoring process may, after finding an affinity of email domain, run a counter-check, and exclude all such affinities where the common email domain is on a list of "non-affinity" domains. Similar counter-checks may be included following a hit on any of the other affinity tests, as may be appropriate. For example, having a common last name with a contact, where the surname in question is very common, such as "Smith" or "Jones" may be initially stored as an indication of familial affinity, but later deleted under a "common name counter-check", for example. On the other hand, however, many actual relatives spell their last names differently, so in any affinity test based on surname, a tolerance of spelling variations may be used. For example, people having the names Dwek, Doueck, Dweck (which means "goldsmith" in Arabic) are often cousins, whose fathers or grandfathers, upon immigrating to the United States, adopted variant spellings of the foreign surname. A similar phenomenon is seen in geographical based names from foreign lands, such as those named Funes, Funis, DeFunes, DeFunis, etc., all hailing from the Spanish city of "Funes."

Thus, once the scorings at 330 are completed, for each contact there may be stored an affinity score. The list may then be ranked according to the scores, for example, from highest to lowest score, to impose a cutoff score, if desired, where only contacts having a score equal to or greater than such cutoff score are sent invitations, or a certain specified type of invitation. Alternatively, in some embodiments, all contacts, regardless of score, may be sent an invitation, for example, and the ranking used for other purposes, such as precedence or prioritization, or value of incentive. The list of valid contacts and their associated affinity scores with the user may be output as a ranked contact list at 340.

Using the ranked contact list, at 350, an exemplary system or application may offer incentives to a user to invite some or all of the contacts on the ranked contact list to sign up as users. The incentive may be a function of the score of each contact, designed to motivate the user to at least invite those contacts with the highest connection to her, and thus most likely to respond positively to her invitation. As noted above, an exemplary presentation to a user may have the form of FIG. 2, where the same incentive is offered for every contact, and a list of recommended contacts is listed. Or, for example, a user may be presented with various other screen shots or user interfaces designed to encourage the sending of invitations by, or under the aegis of, the user. Some examples of various such user interfaces and screen shots are found in United States Utility patent application Ser. No. 13/958,183, entitled "Referral Slider" under common assignment hereof, filed on Aug. 2, 2013, the entire disclosure of which is hereby incorporated herein by reference.

Finally, at 360, invitations may be sent to some or all of the contacts on the ranked contact list. The invitation may be left to the user to compose, and may be sent by email, text, SMS, voicemail, or otherwise. Or, for example, to minimize the effort requested of the user, upon presenting the incentive offering screen to the user a request may be included seeking approval of the user to send an invitation to the listed contacts. Upon the user signaling in the affirmative, an automated invitation may be presented to the user for approval, and automatically sent to the contacts, such as, for example, via the user's email client on the device. In some embodiments a user's phone may be accessed to extract SMS contacts. Various levels of automation may be utilized in various contexts and various embodiments, from leaving the entire task to the user, to essentially automating the entire task, and only seeking the user's consent, to a middle ground where a form invitation is presented to the user that allows her to edit and customize the invitation for each contact who is to receive it, and then send it.

Figure 4:
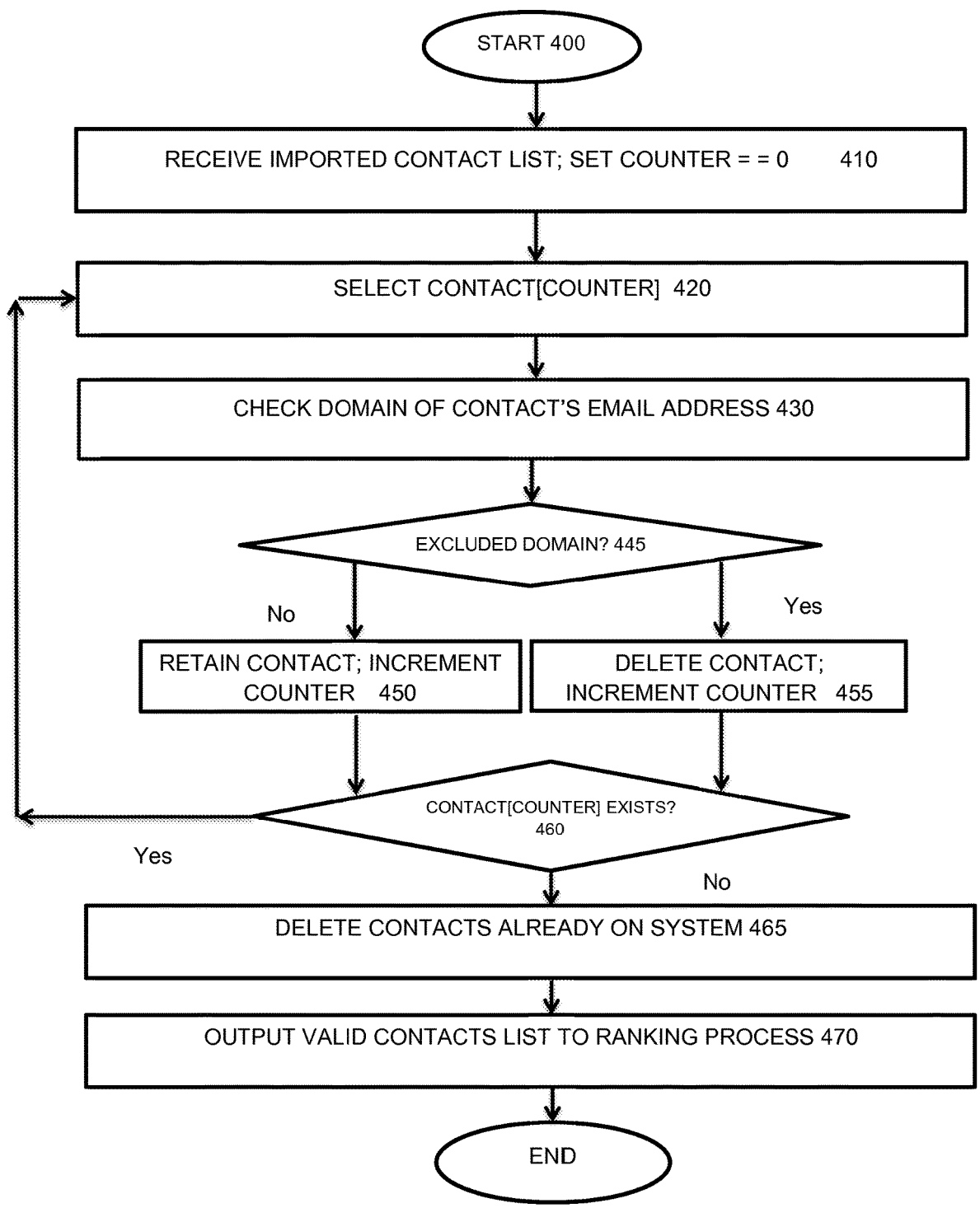
FIG. 4 is an exemplary process flow diagram for an illustrative contact importation and initial culling in accordance with some embodiments of the invention.
Figure 5:
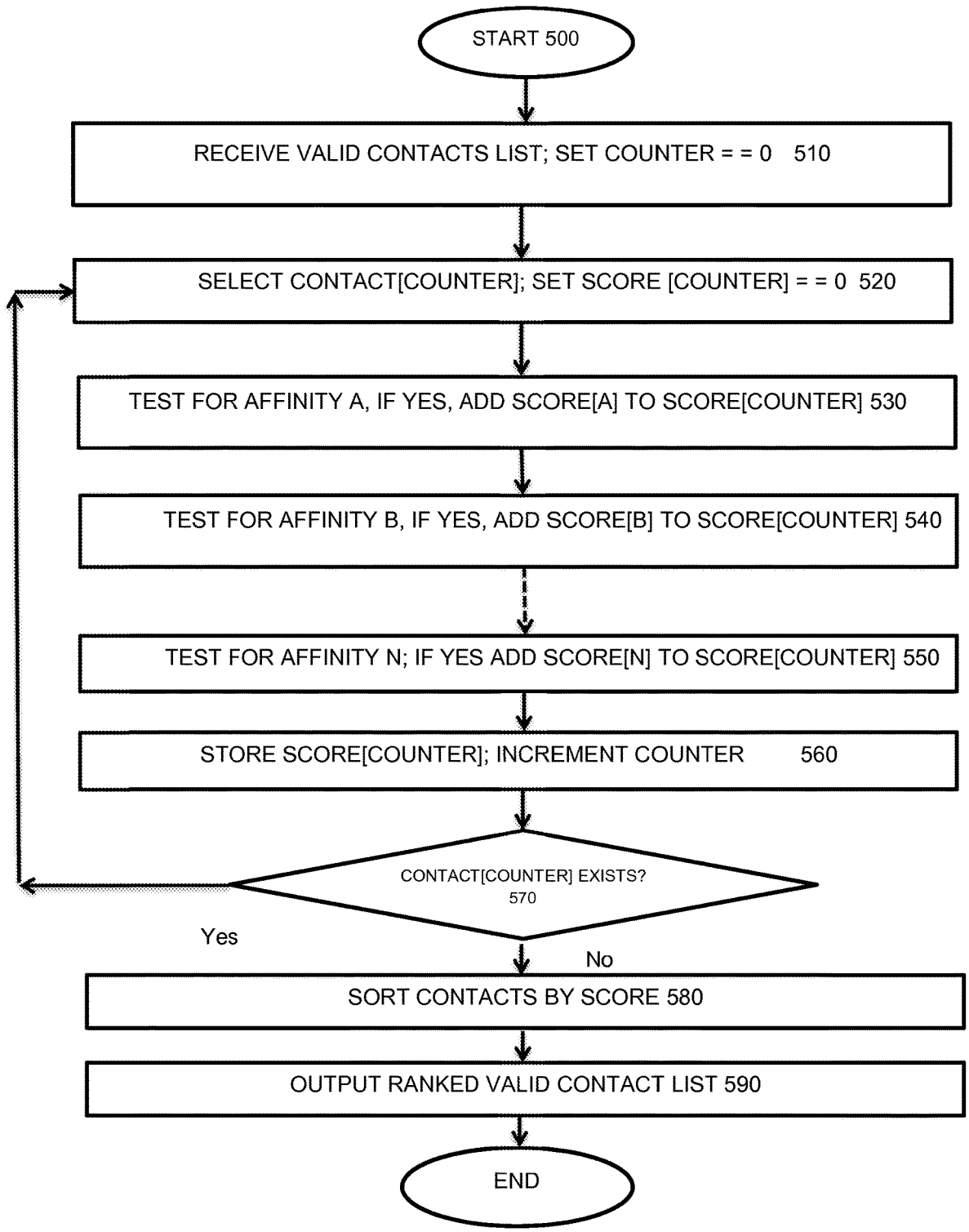
FIG. 5 is an exemplary process flow diagram for a ranking process for valid imported contacts in accordance with some embodiments of the invention.
Figure 6:
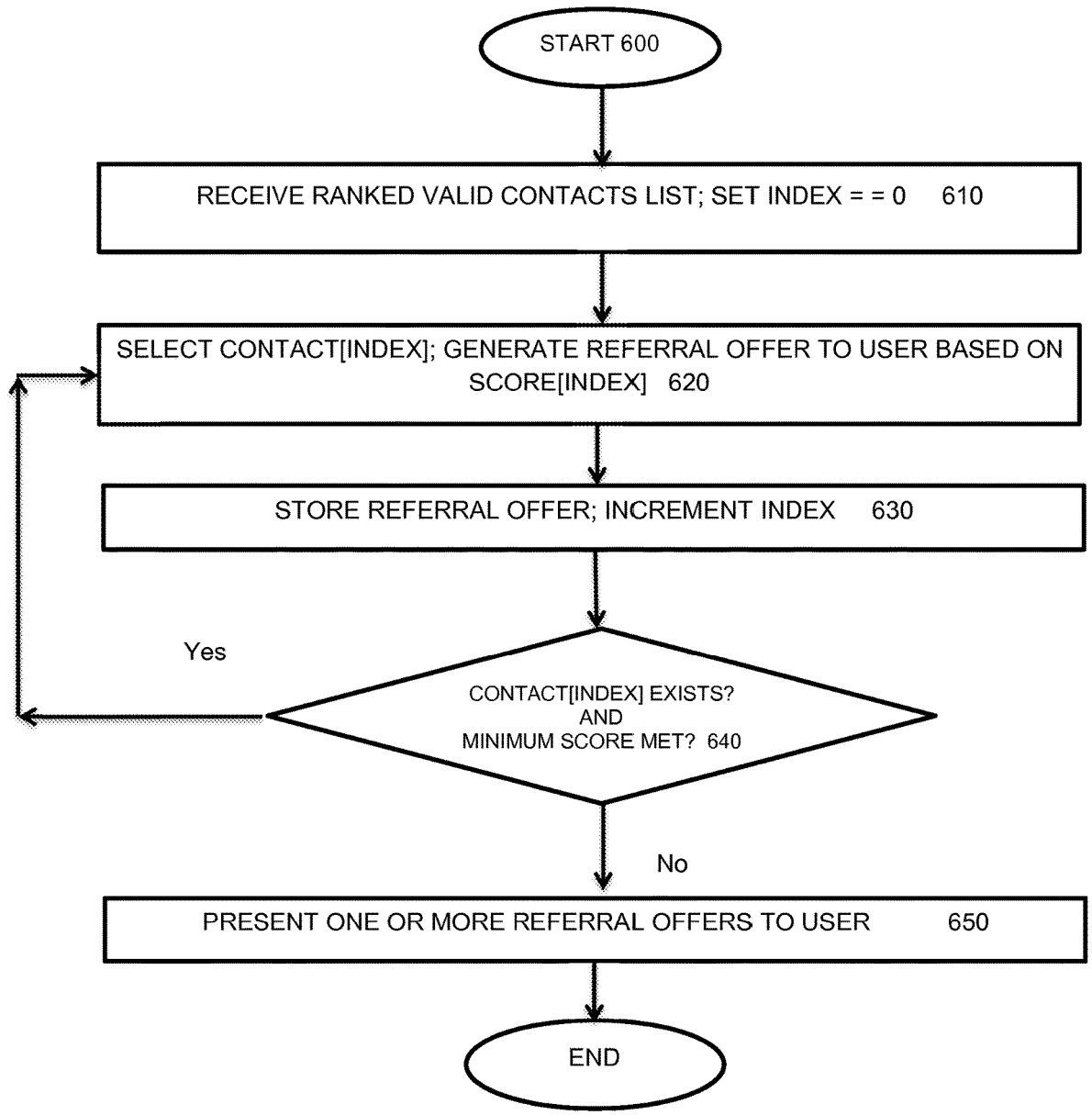
FIG. 6 is an exemplary process flow diagram for generating offers to a user in connection with invitations to valid contacts in accordance with some embodiments of the invention.

FIGS. 4-6, next described, are process flow charts that provide greater detail on steps 320 through 330 of FIG. 3.

Importing Contacts and Initial Culling

FIG. 4 is an exemplary flowchart for a contact importer in accordance with some embodiments of the invention. FIG. 4 illustrates exemplary steps involved in inputting an initial comprehensive gathering of all of a user's potential contacts, and then performing an initial culling of them to obtain a valid contacts list. With reference thereto, the process begins at START 400. From there process flow moves to 410, where the total contact list is received, and a variable COUNTER, an index to the comprehensive contacts list, is set to an initial value of zero.

From there, process flow moves to 420, where the first contact, i.e., CONTACT[0], is selected. At 430 the domain of this contacts email address is checked. If, at 445, it is found to be an excluded domain, as described above, then it is deleted at 455 and COUNTER is incremented, so that the next contact may be accessed, if in fact another contact exists (i.e., the end of the list has not been reached). If yes at 460, then there are still more contacts to process, and flow returns to 420, where the next contact is fetched.

Similarly, if at 445 the email domain is found not to be excluded, then at 450 this contact is retained, process flow moves to 460, and it is determined if there are still more contacts to process, as above. If yes at 460, then there are still more contacts to process, and flow returns to 420, where the next contact is fetched.

If no at 460, then there are no more contacts to process, and at 465 all contacts that are already on the system may be deleted from the retained contacts, and process flow moves to 470, where the valid contacts list may be output to a ranking process, next described. Finally, following 470, process flow ends.

It is noted that the key discriminator in the process of FIG. 4 is the list of excluded domains, used as the test for contact retention or exclusion at 445. In exemplary embodiments of the present invention, this list may be initially populated based on human knowledge, but ultimately may be refined and augmented by machine learning, as described below, following a statistical analysis of large numbers of users of a content management system, the potential contacts generated, and the conversion rate from invitations sent to contacts to new subscribers or users of the content management system. Such "big data" mining may discover hidden or counterintuitive relationships between users, their contacts, and those contacts who ultimately accept the invitation. These relationships may be used in some embodiments to calculate more precise affinity scores.

FIG. 5 illustrates exemplary steps involved in ranking the valid contacts list that was output at step 465 of FIG. 4, and outputting a ranked valid contacts list. With reference thereto, the process begins at START 500. From there process flow moves to 510, where the valid contacts list is received, and a variable COUNTER, an index to the valid contacts list, is set to an initial value of zero.

From there, process flow moves to 520, where the first contact, i.e., CONTACT[0], is selected, and its SCORE, which is an exemplary variable used to hold the overall affinity score of a contact, is set to 0 as well. At 530 through 550 the contact is tested for various affinities with the user, here represented as "TEST FOR AFFINITY A", "TEST FOR AFFINITY B", . . . "TEST FOR AFFINITY N", thus testing for some number K different types of affinities. For each test, if there is found to be an affinity, a score for that particular affinity may be added to the variable SCORE for that contact. The exemplary process of FIG. 5 adds all the affinity scores from each test performed on the contact. Thus, at the end of test N, i.e., at 560 in FIG. 5, there is a cumulative affinity score for the contact in question.

It is noted, however, that in alternative exemplary embodiments, the variable SCORE may be understood to hold the highest affinity score (but not a sum of all the affinity scores for that contact), to simplify the scoring, and have ranking bins with many contacts in them, and thus have a much smaller range of possible scores across all the contacts. In such embodiments, instead of the logic shown in FIG. 5, the following logic would apply for successive affinity tests K and K+1:

```
TEST FOR AFFINITY K;
    IF YES:
        IF SCORE[K] > SCORE[COUNTER]
        REPLACE SCORE[COUNTER] WITH SCORE[K];
TEST FOR AFFINITY K+1;
    IF YES:
        IF SCORE[K+1] > SCORE[COUNTER]
        REPLACE SCORE[COUNTER] WITH SCORE[K+1];
```

In such alternate embodiments, this logic would be used throughout all affinity tests 1 through K, and thus the final score for that contact would simply be the highest score of all the affinity tests that it tested positive for.

Continuing with reference to FIG. 5, at 560 COUNTER is incremented, to move to the next contact in the valid contacts list, and at 570 it is determined if there is another contact in the list. If yes, process flow returns to 520, and the various affinity tests 1 thorough N are applied, as described above. If no at 570, the entire valid contacts list has been processed, and for each contact an affinity score assigned. Process flow then moves to 580, where the list may be sorted by the affinity scores to output a ranked valid contact list at 590, from whence process flow ends. This allows an exemplary system to use a subset of the ranked valid contacts to generate offers to a user, as shown in FIG. 2, if for various reasons (e.g., user overload with many low probability of conversion contacts) it is not desired to offer the user to invite all of her contacts, but rather induce her to participate in the referral invitation process using a targeted, high likelihood of success, truncated list of contacts. Such a subset may include only contacts having an affinity score equal to or greater than a defined value, for example.

Various Affinity Tests and Affinity Scoring

FIG. 5 contemplates applying various affinity tests. In general, these may be initially set by humans, but ultimately may be modified and augmented by statistical analysis on large numbers of users and the interactions with their imported contacts. Next described are various tests that may be used in various exemplary embodiments. One test may be family name (surname) similarity. From the imported contacts an exemplary system can detect if the email contact has a last name and a first name. If the last name is similar to the user's last name, the assumption may be made that the contact is like the user in some way, and is worth reaching out to.

A second exemplary test is common organizational affiliation, such as, for example, which university was attended. For example, if a user went to Stanford, they may register with a given content management system using a Stanford.edu email account. If a list of contacts is imported and it so happens that out of the, say, 400 contacts imported, 50 of them are from Stanford University, usually these Stanford accounts would receive a higher score because of this similarity to user. If the user enjoys using the system, web application, or content management system in question, odds are his or her colleagues from university with whom she keeps in regular communications with would as well.

A third may be, for example, people whom the user interacted with previously on, for example, a content management system, but are not necessarily current users. In many systems a user may interact with others through the system without the others being registered users. Such a content management system, for example, may track all interactions of every user, and thus knows how many times a non-registered user has been sent a share of a content item, for example. This information may, in exemplary embodiments, be leveraged by creating affinity tests such as "number of times user shared content with contact", and "number of times *any* user shared content with contact", and various synthetic variables which are combinations of these two values.

In exemplary embodiments of the present invention, such a score may be augmented by how many times the "share" actually accessed the content shared with him or her. People who are repeatedly shared content with, and who access that content seem likely prospects to join the service. Thus, in the more granular affinity test scoring shown in FIG. 5, for example, an additional score associated with "access rate on shared content in excess of 50%" may be calculated, which would enhance the score of that contact over and above her score for simply being a "sharee" or multiple "sharee" of users on the content management system.

A fourth affinity test may, for example, center on looking at the affinity of different email domains. For example, if a user is at Stanford, they may be likely to invite other people from, for example, Harvard. This is a domain affinity test, which may be expressed as "affinity of contact's email domain to user's domain" which could be assigned a score based on statistical analyses.

It is noted that even when a contact's email address is unknown, such as, for example, when the contact is extracted from a user's SMS client on a phone, sufficient information may be obtained to allow an email address to be searched for, or for the contact to be contacted by an exemplary CMS via other channels, in any event.

Incentivizing Users to Send/Approve Invitations to Contacts

FIG. 6 illustrates exemplary steps involved in generating referral offers to a user based upon the affinity score for each contact. Beginning at 600, process flow moves to 610 where the valid contacts list (obtained at 590 in FIG. 5), is received, and an index is set to 0. At 620 CONTACT[0] is selected, and a referral offer generated based on its score. At 630 the index referral offer is stored, and the index incremented. At 640 a test is performed to see if there are additional contacts, and if at this point in the ranked list the affinity score is sufficiently high. This test allows a system to only generate offers to invite those contacts having a certain affinity, and thus make a targeted effort to secure viable potential contacts. Obviously there need be no minimum score, and thus all contacts will be the subject of a referral offer to the user in such a case. After cycling through all of the contacts on the ranked valid contacts list, the offers may be presented to the user, such as, for example, provided in FIG. 2, or as described in the Referral Slider patent application incorporated above.

Machine Learning to Sharpen Affinity Tests and Predict Whom to Solicit

As noted, in some embodiments the affinity tests may be developed and/or augmented, tweaked and enhanced by machine learning. Such machine learning may include, for example, unsupervised clustering of all the potential contacts who have been invited, what incentives were made to their inviting users, and what results occurred. In some embodiments a content management system may have hundreds of millions of users, and various data mining techniques may be used to infer actual affinities between users and contacts, and likelihoods, given such similarities, of a successful referral conversion.

Thus, in some embodiments training sets may be generated to create multivariate statistical models, or the like, to automatically score each potential contact of a user.

In some embodiments email access, including email API and contact API may be used, and it may be tracked when users send attachments to their contacts, and what size files, for example, are attached. If a user is sending attachments to someone repeatedly, it is very likely that they would want to invite that person to join a content management system. Such information is generally available for Google Gmail accounts, for example.

Exemplary Implementations

Any suitable programming language may be used to implement the routines of particular embodiments including, but not limited to, the following: C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for contact importing and processing, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method of importing and utilizing user contacts comprising:
    importing a plurality of contacts to create an imported plurality of contacts associated with a user of a content management system;
    assigning an affinity score to each contact by:
        calculating a first score value for sharing a same last name between the user and each respective contact;
        calculating a second score value for sharing a same email domain name between the user and each respective contact; and
        calculating a third score value based on a frequency of sharing content items from the user to each respective contact;
    determining one or more contacts having affinity scores that are each greater than a cutoff score;
    identifying, to the user the one or more contacts with affinity scores that are each greater than the cutoff score;
    offering user incentives to provide an invitation request to the one or more contacts with affinity scores that are each greater than the cutoff score; and
    transmitting invitation requests to at least one of the one or more contacts with affinity scores that are each greater than the cutoff score.

2. The method of claim 1, wherein the assigning the affinity score to each contact further includes anti-affinity checks including at least one of:
    excluding the first score value for each respective contact when the respective same last name is a common last name based on a provided list of common last names; and
    excluding the second score value for each respective contact when the respective same email domain name is a common email domain based on a provided list of common email domains.

3. The method of claim 1, wherein each of the imported plurality of contacts comprises at least one of: a contact name and email address, an instant message name, a social media profile, and a phone number.

4. The method of claim 1, wherein the one or more contacts with affinity scores that are each greater than the cutoff score is further refined by machine learning resulting from analyzing past interactions of a plurality of users of the content management system.

5. The method of claim 4, wherein the analyzing users and their interactions in the content management system comprises analyzing results of past invitations by a plurality of other users of their respective contacts.

6. A non-transitory computer readable medium containing instructions that, when executed by at least one processor of a computing device, cause the computing device to:
    import a plurality of contacts to create an imported plurality of contacts associated with a user of a content management system;
    assign an affinity score to each contact by:
        calculating a first score value for sharing a same last name between the user and each respective contact;
        calculating a second score value for sharing a same email domain name between the user and each respective contact; and
        calculating a third score value based on a frequency of shared content items from the user to each respective contact;
    determine one or more contacts having affinity scores that are each greater than a cutoff score;
    identify, to the user, the contacts with affinity scores that are each greater than the cutoff score;
    offer user incentives to provide an invitation request to one or more contacts with affinity scores that are each greater than the cutoff score; and
    transmit the invitation request to at least one of the one or more contacts with affinity scores that are each greater than the cutoff score.

7. The non-transitory computer readable medium of claim 6, wherein the assigning the affinity score to each contact further includes anti-affinity checks including at least one of:
    excluding the first score value for each respective contact when the respective same last name is a common last name based on a provided list of common last names; and
    excluding the second score value for each respective contact when the respective same email domain name is a common email domain based on a provided list of common email domains.

8. The non-transitory computer readable medium of claim 6, wherein each of the imported plurality of contacts comprises at least one of: a contact name and email address, an instant message name, a social media profile, and a phone number.

9. The non-transitory computer readable medium of claim 6, wherein the one or more contacts with affinity scores that are each greater than the cutoff score is further refined by machine learning resulting from analyzing past interactions of a plurality of users of the content management system.

10. A system for displaying potential incentives, the system comprising: one or more processors;
a display; and
memory containing instructions that, when executed, cause the one or more processors to:
  import a plurality of contacts to create an imported plurality of contacts associated with a user of a content management system;
  assign an affinity score to each contact by:
    calculating a first score value for sharing a same last name between the user and each respective contact;
    calculating a second score value for sharing a same email domain name between the user and each respective contact; and
    calculating a third score value based on a frequency of shared content items from the user to each respective contact;
  determine one or more contacts having affinity scores that are each greater than a cutoff score;
  identify, to the user, the contacts with affinity scores that are each greater than the cutoff score;
  offer user incentives to provide an invitation request to one or more contacts with affinity scores that are each greater than the cutoff score; and
  transmit the invitation request to at least one of the one or more contacts with affinity scores that are each greater than the cutoff score.

11. The method of claim 1, wherein each affinity score equals a highest value of calculated score values for each respective contact.

12. The method of claim 1, wherein the user incentives are different for contacts having an affinity score greater than the cutoff score than contacts having an affinity score less than the cutoff score.

13. The method of claim 1, wherein the invitation requests include a first set of invitation requests sent to the contacts having an affinity score greater than the cutoff score that is different from a second set of invitation requests sent to the contacts having an affinity score that is less than the cutoff score.

14. The non-transitory computer readable medium of claim 9, wherein the analyzing users and their interactions in the content management system comprises analyzing results of past invitations by a plurality of other users of their respective contacts.

* * * * *